(12) United States Patent
Naono et al.

(10) Patent No.: US 8,311,868 B2
(45) Date of Patent: Nov. 13, 2012

(54) BUSINESS ANALYSIS SYSTEM AND METHOD

(75) Inventors: Ken Naono, Tokyo (JP); Masashi Egi, Kokubunji (JP); Takao Sakurai, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1587 days.

(21) Appl. No.: 11/798,149

(22) Filed: May 10, 2007

(65) Prior Publication Data

US 2007/0265898 A1    Nov. 15, 2007

(30) Foreign Application Priority Data

May 10, 2006   (JP) .................. 2006-131194

(51) Int. Cl.
  *G06F 17/50*    (2006.01)
(52) U.S. Cl. ....................................... 705/7.22
(58) Field of Classification Search .................. 705/7.22
  See application file for complete search history.

(56) References Cited

U.S. PATENT DOCUMENTS

2003/0204367 A1* 10/2003 Hartigan et al. ............. 702/178

FOREIGN PATENT DOCUMENTS

| JP | 07-325870   | 12/1995 |
| JP | 11-338923   | 12/1999 |
| JP | 2002-107473 | 6/2001  |
| JP | 2003-216694 | 7/2003  |
| JP | 2004-038234 | 2/2004  |

OTHER PUBLICATIONS

Chatterjee et al. "Modeling the Clickstream: Implications for Web-Based Advertising Effects." Marketing Science, vol. 22, No. 4 (Autumn, 2003), pp. 520-541.*
Ken Naono, et al., "Case Study on Business Activity Analysis of Sales-Back Office", IPSJ SIG Technical Report, 2006-DSM-40, Japan, Information Processing Society of Japan, Mar. 29, 2006, vol. 2006, No. 38, pp. 103-108 (2006).
Office Action from Japanese Patent Office issued Feb. 1, 2011 in the corresponding Japanese Patent Application No. 2006-131194 (2 pages).

* cited by examiner

*Primary Examiner* — Susanna M Meinecke Diaz
(74) *Attorney, Agent, or Firm* — Stites & Harbison, PLLC; Juan Carlos A. Marquez, Esq.

(57) ABSTRACT

To readily understand contents of business operations without burdening an operator, this invention provides a business analysis method including: obtaining information on operations of a user with respect to software programs selected by the user among the plurality of software programs operated by a computer; estimating one business content that is executed by the computer in each of time spans based on a combination of exploited identification information of the plurality of software programs.

8 Claims, 16 Drawing Sheets

60 OPERATING RECORD FILE

| DAY | TIME | OPERATION | MONITORING OBJECT |
|---|---|---|---|
| 2005.12.14 | 10:43:32 | L_Botton_Down | BROWSER + Telephone Call |
| 2005.12.14 | 10:43:33 | L_Botton_Down | BROWSER + Telephone Call |
| 2005.12.14 | 10:43:34 | L_Botton_Down | SPREADSHEET + Customer Database |
| 2005.12.14 | 10:43:40 | L_Botton_Down | BROWSER + Telephone Call |
| 2005.12.14 | 10:43:41 | Key_Up | WORD PROCESSOR + Customer Report |
| 2005.12.14 | 10:43:45 | Key_Down | SPREADSHEET + Customer Database |
| 2005.12.14 | 10:45:22 | L_Botton_Down | BROWSER + Telephone Call |
| 2005.12.14 | 10:45:40 | L_Botton_Down | BROWSER + Telephone Call |

APPLICATION PROGRAM NAME    FILE NAME

*FIG. 4*

150 ANALYSIS DEFINITION

| 151 BUSINESS CONTENTS | 152 FIRST APPLICATION + FILE | 153 FIRST COLOR | 154 SECOND APPLICATION + FILE | 155 SECOND COLOR | 156 COMBINED COLOR |
|---|---|---|---|---|---|
| BUSINESS-A (CALLING) | SPREADSHEET + CUSTOMER DB | GREEN | BROWSER + CALLING FILE | RED | YELLOW |
| BUSINESS-B (REPORTING) | WORD PROCESSOR + CUSTOMER REPORT | BLUE | SPREADSHEET + CUSTOMER DB | GREEN | LIGHT BLUE |
| .. | .. | .. | .. | .. | .. |
| .. | .. | .. | .. | .. | .. |

*FIG. 6*

120 BUSINESS ANALYSIS DATA

| TIME SPAN | FIRST COLOR | SECOND COLOR | COMBINED COLOR | BUSINESS CONTENTS |
|---|---|---|---|---|
| 1 | GREEN | RED | YELLOW | BUSINESS-A |
| 2 | RED | GREEN | YELLOW | BUSINESS-A |
| 3 | GREEN | BLUE | LIGHT BLUE | BUSINESS-B |
| 4 | BLUE | GREEN | LIGHT BLUE | BUSINESS-B |
| : | : | : | : | : |
| : | : | : | : | : |
| N | BLUE | GREEN | LIGHT BLUE | BUSINESS-B |

*FIG. 9*

BUSINESS ANALYSIS SYSTEM AND METHOD

CLAIM OF PRIORITY

The present application claims priority from Japanese application P2006-131194 filed on May 10, 2006, the content of which is hereby incorporated by reference into this application.

BACKGROUND OF THE INVENTION

This invention relates to a method of analyzing business operations that use a computer, and more particularly, to a method and a system for conducting an analysis of business operations from operation records of a computer that uses a plurality of applications or a plurality of objects.

Along with widespread proliferation of computers (hereinafter referred to as "PC") such as a personal computer or a workstation as well as the proliferation of a network, in the recent offices, it is general that each of employees (or each of operators) has a PC and conducts the business operations on the PC.

Compared with past works using a voucher, the business operations (desk work) that mainly use the PC facilitate counting of data, thereby enabling an efficiency of the business operations to be improved. On the other hand, in the case of the business operations that mainly uses the PC, because information is mainly produced and processed, a material object such as the voucher is not always output as in past examples. In the past examples, if a large number of the vouchers or the materials exist on a desk of an employee, the progress of his or her business operations may be slow. In the past examples, a manager of the business operations may examine distributions of the business operations based on amounts of the vouchers and the materials held by the respective employees.

On the other hand, in the recent business operations that mainly uses the PC, because the operations of information are main works, it is difficult for the manager of business operations to adequately understand an amount of works (quantity of business operations) of the employees.

The understanding of the amount of the works of the respective employees may also be obtained as the results of face-to-face hearing from the employees. However, because the results of the hearing include a subjectivity of the manager or the employee being the object of the hearing, it is impossible to conduct an analysis objectively.

Under the circumstances, there has been known a technique in which icons indicative of the contents of business operations are displayed in each of business types on a display of the PC in the office, and the icon corresponding to the business type that starts is clicked every time the employee starts the business operations, to thereby understand the contents of business operations of the employee (for example, JP-A 2002-107473). In the above conventional example, in a case where the employee receives a calling, a telephone icon on the display of the PC is clicked. In a case where the voucher is created or corrected, a voucher icon is clicked. Then, the clicked contents are tabulated later to understand the contents of business operations in each of the employees.

SUMMARY OF THE INVENTION

However, in the above conventional example, the icon must be clicked every time the employee starts new business operation, and in a case where the icon is not clicked, it is assumed that the contents of business operations that have been clicked previously is continued. For that reason, there has been such a problem that it is difficult to measure the contents of business operations of the employees. Also, in the above conventional example, because the employee is demanded to conduct a new business operation in order to measure the contents of business operations, the business load merely increases with respect to the employee, and an efficiency of the business operations is deteriorated.

In particular, in a case of conducting the reference or correction of the voucher, or the reference or correction of the documents or materials while answering to the calling, it is necessary that after the telephone icon on the display of the PC is clicked, the voucher icon is clicked to extract the voucher while answering to the calling, and the voucher is referred to or corrected. In such an example described above, an excessive load is exerted on the operator, and the operator cannot afford to conduct the click operation for merely understanding the contents of the business operations from which the operator may not gain any benefit. Accordingly, the above conventional example suffers from such a problem that it is impossible to accurately understand the contents of the business operations or the amount of the business operations of each of the employees.

Under the above circumstances, this invention has been made in view of the above problems, and therefore an object of this invention is to readily understand the contents of the business operations without burdening the employee or the operator.

This invention provides a business analysis method that analyzes contents of business operations conducted by a user of a computer based on operation records of the user with respect to a plurality of software programs operated by the computer. The business analysis method includes: obtaining information on operations of a user with respect to software programs selected by the user among the plurality of software programs operated by a computer; storing the obtained information on operations of the user as the operation records in association with times at which the operations are performed and with identification information of the software programs to be operated; obtaining a time range during which analysis is conducted; and dividing the obtained time range into a plurality of time spans by a predetermined time interval. The method also includes: comparing each of the times of the stored operation records with the corresponding time span within the time range to exploit the respective operation records in the respective time spans; obtaining occurrence frequencies of the identification information of the respective software programs from the exploited operation records in the respective time spans; exploiting the identification information of the plurality of software programs in a higher order of the occurrence frequency to a predetermined ordinal rank in the respective time spans; and estimating one business content that is executed by the computer in each of the time spans based on a combination of the exploited identification information of the plurality of software programs.

Also, the color information is set in advance for each of the identification information of the software programs, and the color information of the identification information of the plurality of software programs exploited is combined together to produce information on a combined color, and the information on the combined color is output as estimated business contents.

Accordingly, this invention is capable of estimating one business content of the business operations that are conducted by a computer in each of time spans, and readily understanding the transition of the contents of business operations in each of the time spans. Further, this invention is capable of readily understanding a difference in the properties of the business operations in each of the users of the computers or the characteristic in the users. Also, this invention is capable of suppressing an increase in the business load since it is unnecessary to conduct the operations only for analyzing the contents of business operations.

In particular, it is possible to understand by intuition the transition of the contents of business operations in each of the time spans which are conducted by using the PC by outputting the estimated business contents with a combined color.

BRIEF DESCRIPTION OF THE DRAWINGS

FIG. 4 is an explanatory diagram showing an example of log stored in an operation record file;

FIG. 6 is an explanatory diagram showing an example of an analysis definition that sets a plurality of sets of application program names and file names with respect to one business content;

FIG. 9 is an explanatory diagram showing an example of contents of business analysis data;

DETAILED DESCRIPTION OF THE PREFERRED EMBODIMENTS

Hereinafter, a description will be given of an embodiment of this invention with reference to the accompanying drawings.

Figure 1:
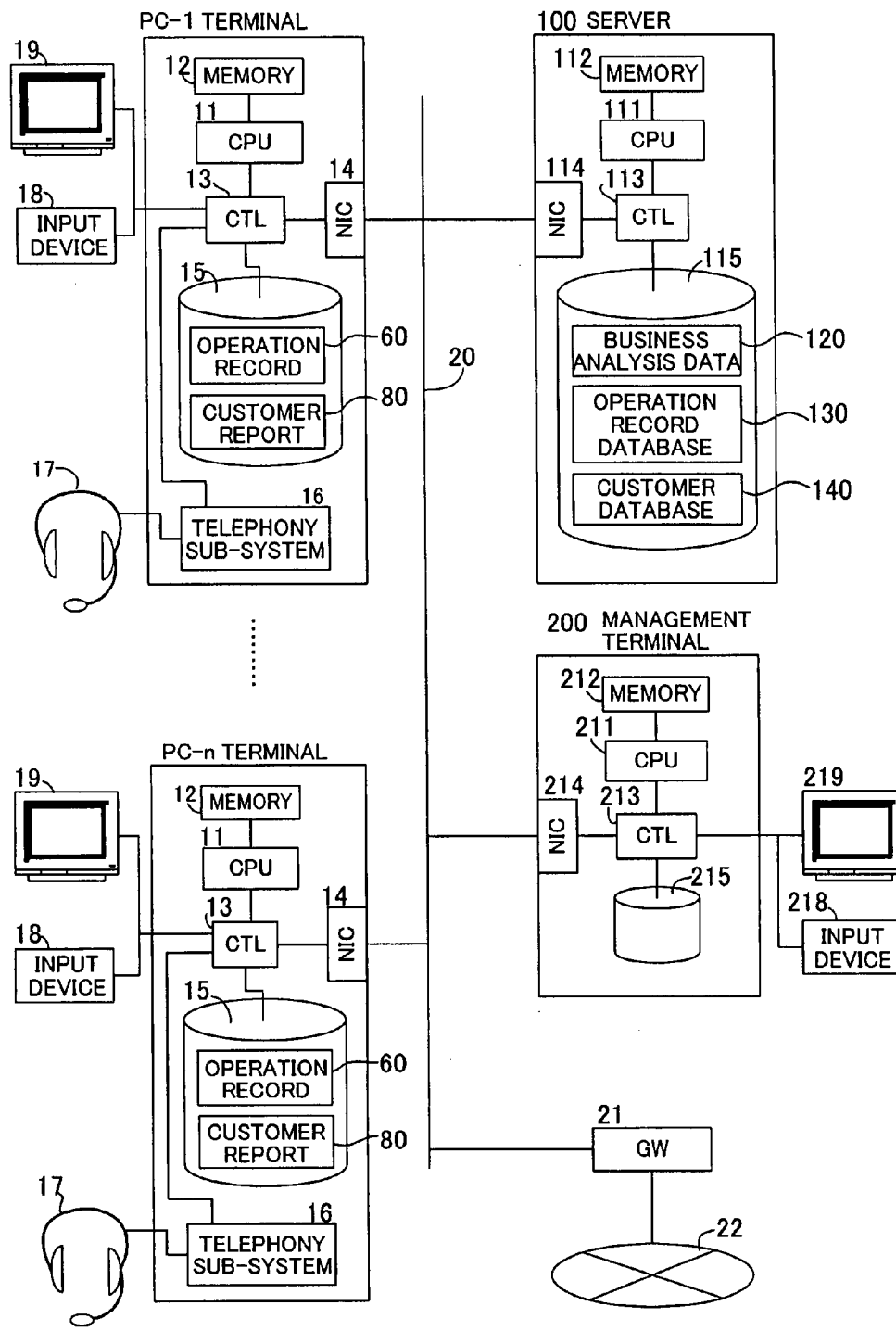
FIG. 1 is a block diagram showing a computer system according to a first embodiment of this invention.

FIG. 1 is a block diagram showing an example in which this invention is applied to a computer system in an office, which serves mainly for call handling services. In the office shown in FIG. 1, a plurality of operators (or employees or users) operate n respective terminals PC-1 to PC-n, respectively, and handles calls with a customer. Then, the respective operators operate the respective terminals (client computers) PC-1 to PC-n, and compiles a customer report 80 on the results of calls for the client, or refers to or corrects the customer database (hereinafter, referred to as "customer DB"), as a main business. The office is a so-called "call center" that mainly conducts the calling business and the report business of the calling results. Also, the operators are users of the respective terminals (computers) PC-1 to PC-n, and the terminals PC-1 to PC-n are allocated to the plurality of operators.

Referring to FIG. 1, a network 20 is connected with a plurality of terminals PC-1 to PC-n that are operated by the operator, and also connected with a server 100 that analyzes the contents of the business operations that have been conducted by the respective terminals PC-1 to PC-n. The operation that has been conducted by the terminals PC-1 to PC-n is stored in operation record files 60 of the respective terminals PC-1 to PC-n, and the contents of the operation record files 60 are transmitted to the server 100 at a given timing. In the server 100, a business analysis application 300 that will be described later analyzes the operation records that have been collected from the respective terminals PC-1 to PC-n, and stores the analysis result in the business analysis data 120. Then, the manage of the business operations who manages the respective operators refers to the business analysis data 120 from the management terminal 200, thereby making it possible to browse the contents of the business operations that have been conducted by the respective operators every given time span M (time interval).

As will be described later, in each of the terminals PC-1 to PC-n, an agent 400 that acquires the operation that has been conducted by the operator and produces the operation record file 60 is activated. The server 100 is so designed as to acquire the operation records from the agents of the respective terminals PC-1 to PC-n, and analyze the contents of business operations in each of the terminals PC-1 to PC-n.

Each of the terminals PC-1 to PC-n that conducts the calling business and the report business of the calling results by the operators includes a CPU 11, a memory 12 that temporarily stores program or data therein, a data transfer controller 13 that controls an access of the CPU 11 and I/O, a network interface (NIC in the figure) 14 that is connected on a network 20, and a storage system 15 that stores information therein, a telephone sub-system 16 that conducts calling by means of a head set 17, an input device 18 for inputting information, including a mouse, a keyboard, or the like, and a display 19 that displays the information.

As will be described later, the memory 12 loads an operating system (hereinafter referred to as "OS"), an application that is used for the calling business or the report business, and a business monitor agent that acquires the operation of the operator therein. The CPU 11 executes the OS, the application, and the business monitor agent. The business monitor agent will be described later.

The telephone sub-system 16 constitutes, for example, an IP telephone, and calls for an external telephone of the network 20 by the aid of a voice over internet protocol (VoIP). The network 20 is connected to a WAN 22 through a gateway apparatus (GW in the figure) 21 that is made up of a router. The WAN 22 is made up of, for example, an internet or a local IP network. The telephone sub-system 16 calls a public line or another IP telephone from a line that is connected with the WAN 22. For that reason, the telephone sub-system 16 has the head set 17 with a microphone and a headphone. The telephone sub-system 16 includes an A/D converter and a D/A converter, is controlled by a browser and a telephony record file, and calls a given telephone number.

The management terminal 200 that is operated by the manager of the business operations is identical with a configuration in which the telephone sub-system 16 is removed from each of the terminals PC-1 to PC-n. That is, the management terminal 200 includes a CPU 211 that executes arithmetic processing, a memory 212 that temporarily stores program or data therein, a data transfer controller 213 that controls an access of the CPU 211 and I/O, a network interface (NIC in the figure) 214 that is connected on the network 20, and a storage system 215 that stores information therein, an input device 218 that is made up of a mouse and a keyboard, and inputs the information, and a display 219 that displays the information.

In the management terminal 200, the manager of the business operations sets the analysis condition with respect to the server 100, or browses the analysis results. The setting operation and the browsing operation are conducted by using a given software program such as a browser.

Figure 2:
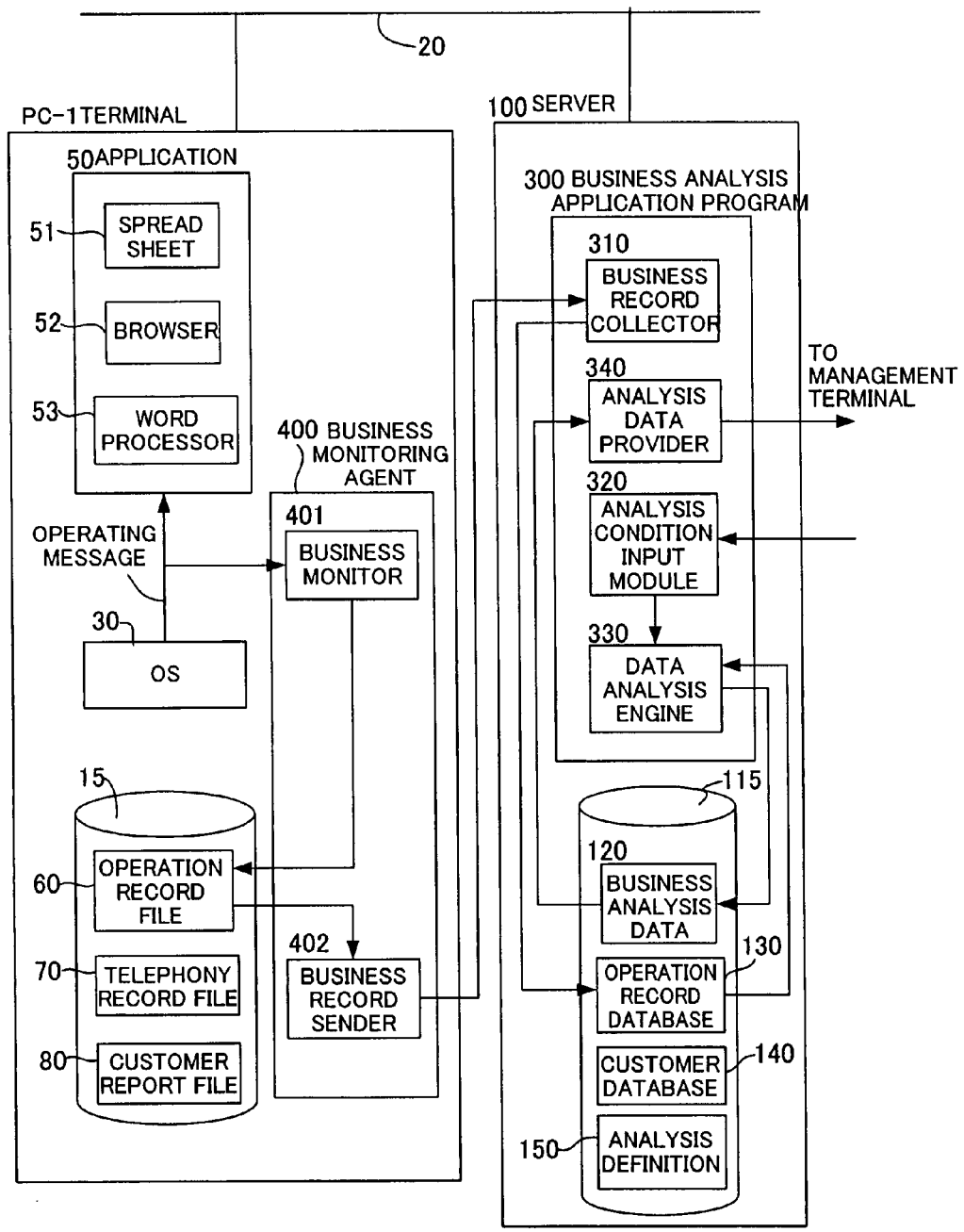
FIG. 2 is a block diagram showing a function of software program that is activated by a terminal and a server.

In the server 100, a database management system (DBMS) that provides a customer DB 140 shown in FIG. 2, and the business analysis application 300 that analyses the contents of business operations of the respective terminals PC-1 to PC-n are operated. The DBMS according to this embodiment is made of a known DBMS, and its detailed description will be omitted. The server 100 includes a CPU 111 that executes the arithmetic operation, a memory 112 that temporarily stores program or data therein, a data transfer controller 113 that controls an access of the CPU 111 and I/O, a network interface (NIC in the figure) 114 that is connected on the network 20, and a storage system 115 that stores information therein.

The business analysis application 300 and the DBMS are loaded in the memory 112 of the server 100, and executed by the CPU 111. The detail of the business analysis application 300 will be described later.

FIG. 2 is a block diagram showing the function of software program operated by the terminal PC-1 and the server 100 shown FIG. 1. Since the terminals PC-1 to PC-n are identical in the configuration with each other, only the terminal PC-1 will be described.

In the terminal PC-1, an application 50 for conducting a calling business or the report business on the OS 30, and the operation of the application 50 and the OS 30 by the operator are detected, and the business monitor agent 400 that is stored in the operation record file 60 is activated.

First, the calling business opens a given telephony record file 70 by means of the browser 52, and inquires of a customer by means of the telephone sub-system 16. Then, the calling business executes a word processor 53 or a spread sheet 51, and records the responses to the customers. Alternatively, the calling business opens the customer DB 140 by the spread sheet 51, and refers to the information on the customers. Upon completion of the calling for the customers, the calling business opens the customer report 80 that is stored in the storage system 15 by means of the word processor 53, and records the response to the clients. Also, if a sales treatment is required, the calling business produces an instruction by the spreadsheet 51 or the word processor 53 in order to transmit the requirement to sales representatives.

Figure 3:
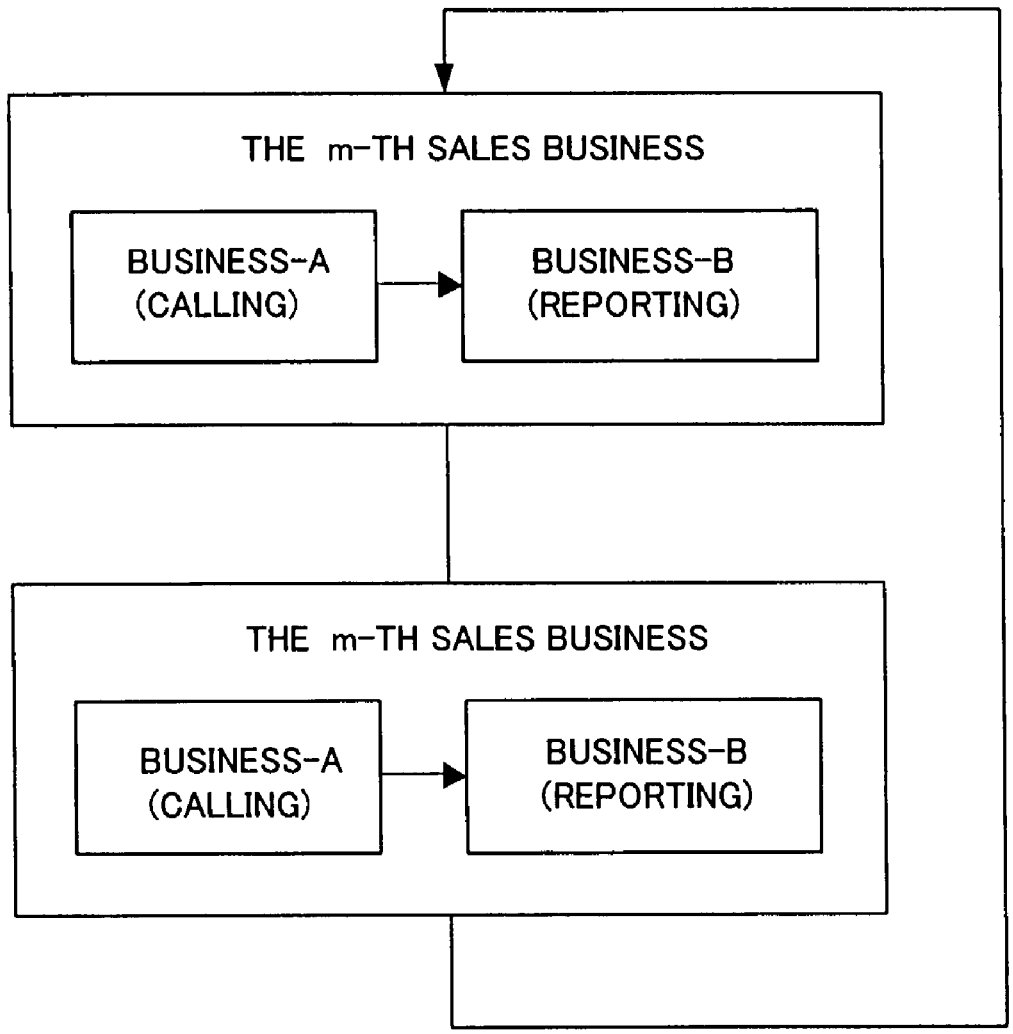
FIG. 3 is a flowchart showing a procedure of a business operation conducted by the computer system shown in FIG. 1.

As shown in FIG. 3, the business in the office repeats a business A mainly including a calling for a given customer (for example, explanation or sales solicitation of a given product), and a business B that records responses to the customers in the customer report 80.

The business A mainly uses the telephony record file 70 by the aid of the browser 52, and the business B mainly uses the customer report 80 by the aid of the word processor 53. In addition, the operator arbitrarily uses the spreadsheet 51, the word processor 53, or the customer DB 140 in order to produce a memo or refer to the customer information.

Referring to FIG. 2, the business monitor agent 400 mainly includes a business monitor 401 that detects the operation (information on operations) of the operator with respect to a software program (for example, an application and a file) that is executed by the terminal PC-1, and stores the operation record (log) in the operation record file 60, and a business record sender 402 that transmits the operation record file 60 that has been stored in the storage system 15 to the server 100 in a given period (for example, one hour or one day).

The business monitor 401 detects the click operation of a mouse of the input device 18 or the type operation of a keyboard by means of the OS 30, hooks an operation message (information on operations) that is issued with respect to the application 50 to be operated, and acquires the contents of the operation that has been executed by the operator, a name of the application 50 to be operated, and a name of the file. Then, the business monitor 401 produces the operation record (log) including the acquired operation contents, the date, the name of the application 50 to be operated, and the name of the file as one set, and stores the operation record in the operation record file 60. The operation record that has been recorded in the operation record file 60 of the storage system 15 is transmitted to the server 100 by the business record sender 402 in the above given period. The business record sender 402 can delete the business record that has been completely transmitted to the server 100 from the operation record file 60.

As shown in FIG. 4, the operation record that has been conducted by the operator of the terminal PC-1 is stored in the operation record file 60 that has been acquired by the business monitor 401. The operation record file 60 shown in FIG. 4 includes a date 601 on which the business monitor 401 acquires the information on operations in one entry, a time at which the business monitor acquires the information on operations, likewise, an operation 603 indicative of operation contents (information on operations) that is hooked from the OS 30, and a monitoring object 604 that is identification information of software program which is made up of the application program name plus the file name which are hooked from the OS 30, likewise. The application program name plus the file name function as the identification information of the software program which is executed by the terminal PC-1 to PC-n.

The operation of the operator such as left click of the mouse (L_Botton_Down in the figure), push down of a key on the keyboard (Key_Down in the figure), or release of the key (Key_Up in the figure) is recorded in the operation 603 of the operation record file 60. The application program name plus the file name whom the OS 30 informs of the message are stored in the monitoring object 604 of the operation record file 60.

Referring to FIG. 4, "browser+telephone call" that has been recorded in the monitoring object 604 indicates that the telephony record file 70 is operated by the aid of the browser 52, and it can be estimated that the operator has conducted calling. Also, "spread sheet+customer database" that has been recorded in the monitoring object 604 indicates that the customer DB 140 is operated by the aid of the spread sheet 51, and it can be estimated that the operator has referred to the customer information. Also, "word processor+customer report" that has been recorded in the monitoring object 604 indicates that the customer report 80 is operated by the aid of the word processor 53, and it can be estimated that the operator has conducted reporting.

As described above, the contents of the operation of the operator, the application program name plus the file name by which the operation has been conducted are stored in the operation record file 60 in a time series manner. Then, the operation record file 60 is transmitted to the server 100 at a given timing.

Figure 5:
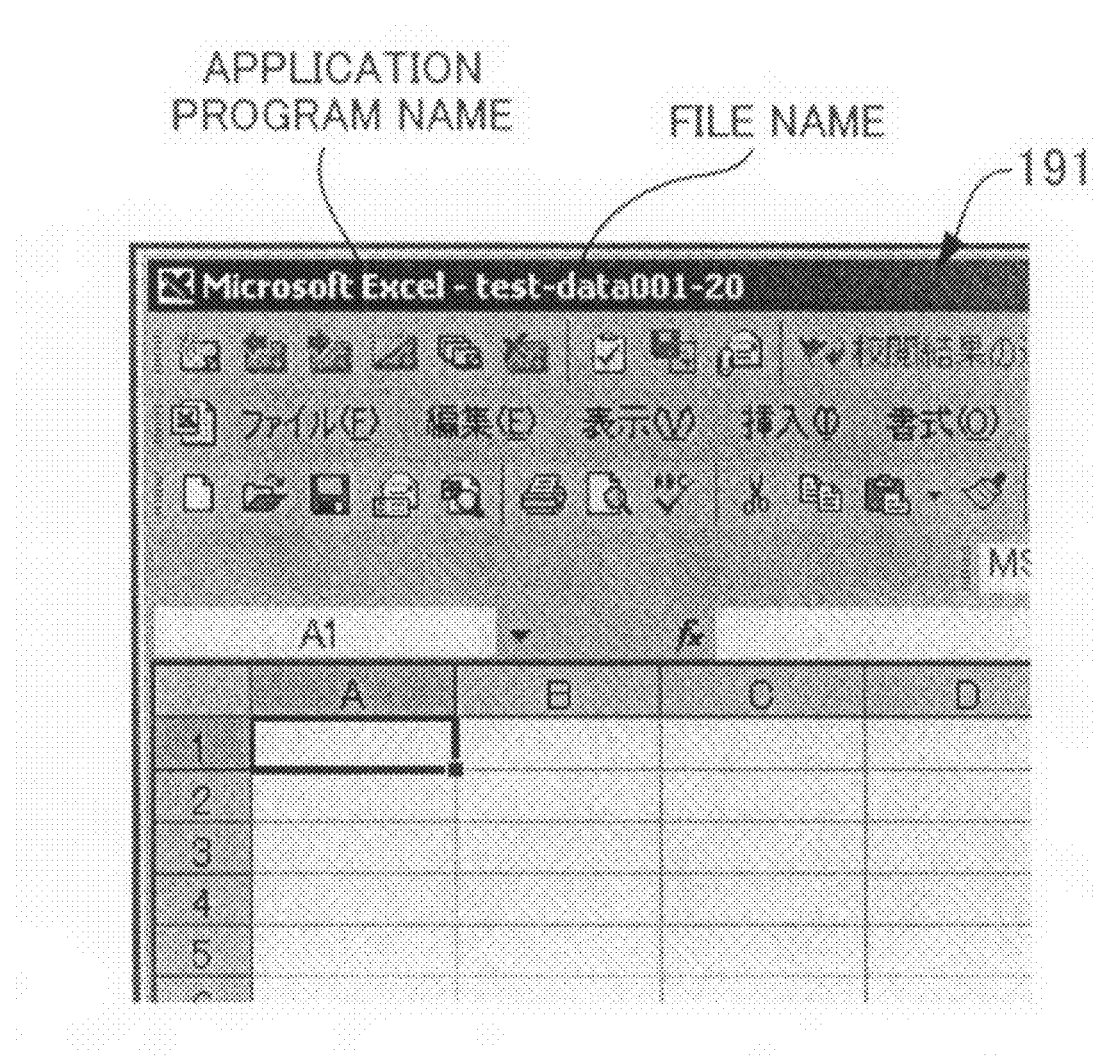
FIG. 5 is an explanatory diagram sowing a part of an application window that is displayed on a display.

In this situation, the application program name plus the file name are displayed on a title bar of the window 191 within the display 190 as shown in FIG. 5, for example, in the case where OS 30 is Windows, and in the example shown in the figure, "Microsoft Excel" indicates the application program name, and "test-data001-20" indicates a file name.

Subsequently, a description will be given of the business analysis application 300 of the server 100 that conducts the analysis of the contents of business operations which have been conducted by the respective operators, by collecting the operation records of the respective terminals PC-1 to PC-n with reference to FIG. 2.

The business analysis application 300 includes a business record collector 310 that acquires the operation record that has been received from the respective terminals PC-1 to PC-n, an analysis condition input 320 that sets a parameter that analyzes the contents of business operations, a data analysis engine 330 that analyzes the contents of business operations in each of the operators based on the operation record and the parameter, and an analysis data provider 340 that provides the management terminal 200 with the results that have been analyzed by the data analysis engine 330.

The business record collector 310 stores the operation records that have been recorded from the respective terminals PC-1 to PC-n into the operation record database (DB) 130 of the storage system 115 in each of the terminals. The contents of the operation record DB 130 are stored in the format in which the identifiers (or use identifiers of the operators) are added to the contents of the operation record file 60 shown in FIG. 4. For example, the operation record DB 130 stores the contents that the terminal identifier is added to the date 601, the time 602, the operation 603, the monitoring object 604 of the operation record file 60 shown in FIG. 4 as one record.

The analysis condition input module 320 receives the times (start time and end time) at which the analysis of the contents of business operations is conducted from the management terminal 200, and information on the time span W (time interval) and the terminal to be analyzed (or the user identifier) as the analysis conditions. Then, the analysis condition input module 320 sets the received time, the time span M, and the information to be analyzed as the analysis conditions (parameters) when the data analysis engine 330 executes the analysis.

Also, the analysis condition input module 320 receives the combination of the business operations and colors (color information) corresponding to the business operations, for producing the analysis results from the management terminal 200, and stores the received combination and colors in the storage system 115 as an analysis definition 150. In this example, as shown in FIG. 6, the analysis definition 150 first sets a color (color information) with respect to the combination of the application program name plus the file name. For example, in this embodiment, the analysis definition 150 sets the color with respect to the combination of the application program name plus the file name as follows:

Spread sheet+Customer DB→Green
Browser+Calling file→Red
Word Processor+Customer report→Blue As described above, in the combination of the application program name with the file name, colored rays obtained by combining three colors consisting of RGB (red, green, blue) together are set, respectively.

Then, as shown in FIG. 6, the combinations of the application program names plus the file names which correspond to the contents of business operations are set. That is, one business content is configured by setting a plurality of (at least two) combinations of the application program names plus the file names (or object).

In the example shown in FIG. 6, a first application program name and file name 152 and a second application program name and file name 154 are set in correspondence with a business content 151. Also, a color (hereinafter referred to as "first color") 153 that is set in the first application program name and file name, and a color (hereinafter referred to as "second color") 154 that is set in the second application program name and a file name are set. Further, a color (combined color) 156 that is obtained by combining (adding) the first color 153 and the second color 154 is set. The combined color 156 may be set with a value obtained by adding the components of RGB of the first color 153 and the components of RGB of the second color 154 by means of the server 100.

In FIG. 6, as the contents of business operations 151, a business A mainly including the calling and a business B that is a reporting business mainly including reporting are set. Then, the spread sheet 51 plus the customer DB 140 are set in the first application program name and file name 152 of the business A, and the browser 52 and the telephony record file 70 are set in the second application program name and file name 154.

Similarly, the word processor 53 and customer report 80 are set in the first application program name and file name 152 of the business B, and the spread sheet 51 and the customer DB 140 are set in the second application program name and file name 154.

The data analysis engine 330 starts according to an instruction from the management terminal 200, and analyzes the contents of business operations of a terminal to be analyzed at a time to be analyzed from the operation record DB 130 based on the analysis condition and the analysis definition 150 which are received by the analysis condition input 320. The processing of the data analysis engine 330 will be described below with reference to FIGS. 7 and 8.

Figure 7:
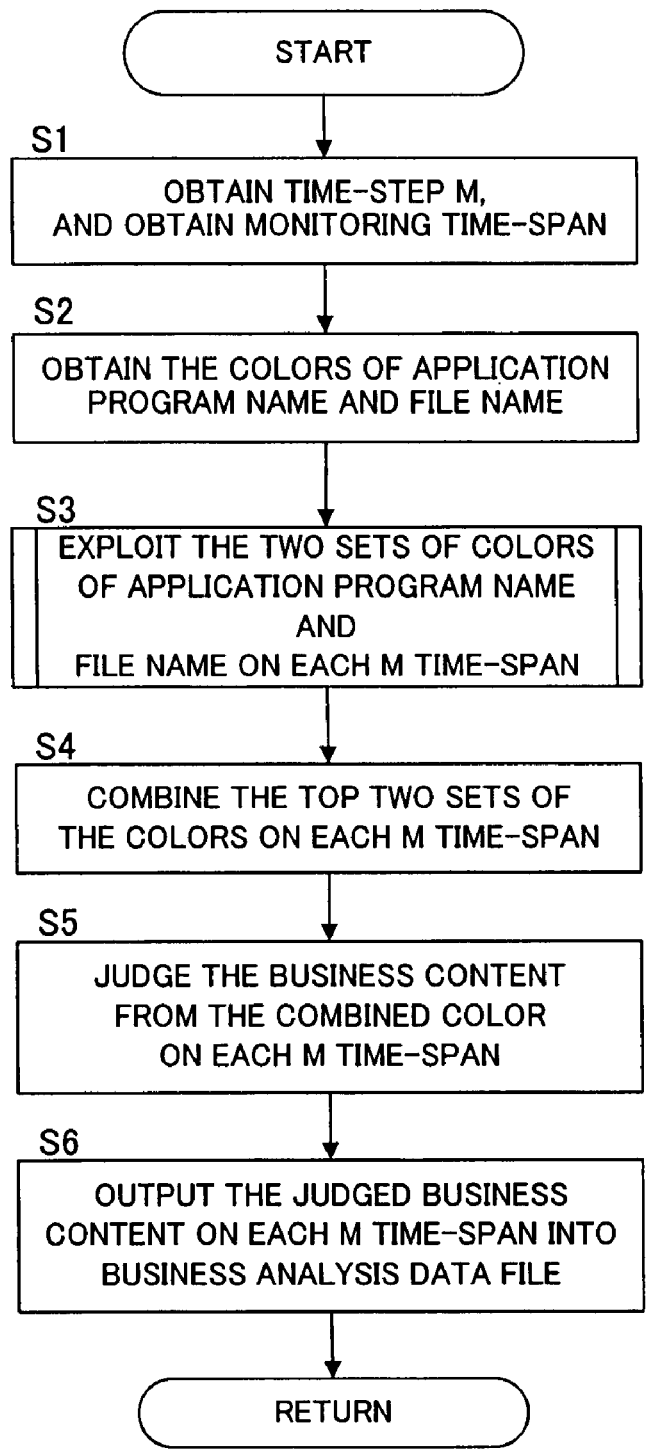
FIG. 7 is a flowchart showing an example of processing executed by a data analysis engine.
Figure 8:
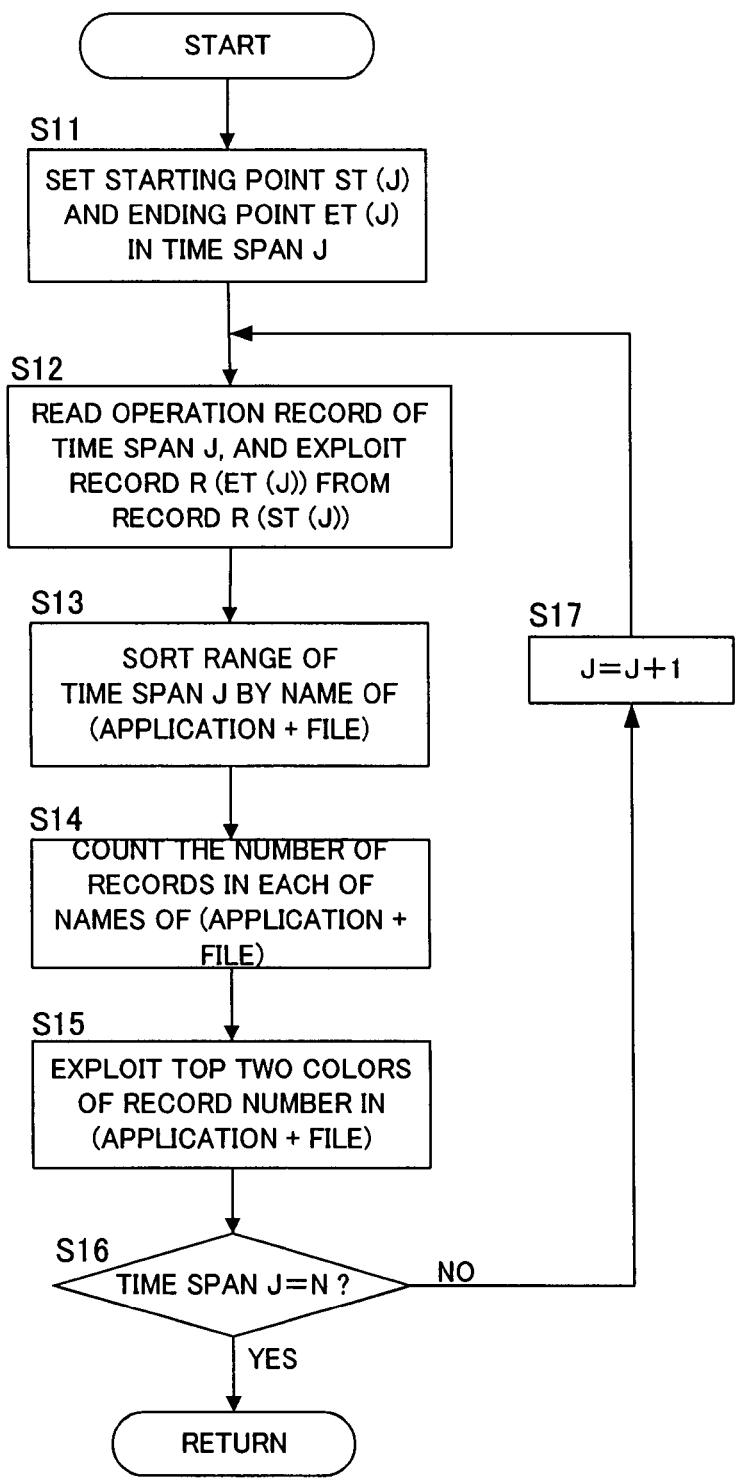
FIG. 8 is a flowchart showing an example of sub-routine executed in S3 of FIG. 7, likewise.

FIG. 7 is a flow chart of a main routine showing an example of processing conducted by the data analysis engine 330, which is executed according to an instruction from the management terminal 200. FIG. 8 is a sub-routine of processing conducted in Step S3 of FIG. 7.

First, in Step S1, the data analysis engine 330 obtains the time span M that has been received by the analysis condition input 320, and a starting time and an ending time of an object to be analyzed. Also, the data analysis engine 330 obtains an identifier of the terminal to be analyzed. For simplification of the following description, the terminal to be analyzed is not described, and it is assumed that the operation record of the single terminal PC-1 is stored in the operation record DB 130. For that reason, the contents of business operations of the respective terminals PC-1 to PC-n are results of executing the processing of FIGS. 7 and 8 in each of the identifiers of the terminals PC-1 to PC-n.

In Step S2, colors 153 and 154 of the application program name and file name are acquired from the analysis definition 150.

In Step S3, the data analysis engine 330 executes the sub-routine shown in FIG. 8, reads the operation record in each of the time spans M, and exploits the top two sets of the colors 153 and 154 of the application program name plus the file name which are higher in the use frequency (occurrence frequency) of the operators. In this processing, in the sub-routine shown in FIG. 8, first in Step S1, the data analysis engine 330 sets a period of time between the starting time and the ending time as time spans J (J=1 to N) that are sectioned in each of the time span M.

Then, the data analysis engine 330 sets the starting time ST (J) and the ending time ET (J) in each of the time spans J. For example, in the case of starting time=10:00, ending time=21:00, and time span M=10:10, starting time ST(1)=10:00, and ending time ET(J)=10:10 in the time span J=1. Likewise, the time span J=2 is between 10:10 and 10:20, and the time span J=N is between 20:50 and 21:00. It is assumed that the operation record of a time T=10:00:00 belongs to a time span J=2.

Also, the data analysis engine 330 defines the time T as a function R(T) indicative of a record number of the operation record DB130 at a time 602 closest to the time T.

In Step S12, the data analysis engine 330 exploits the operation record of the time span J from the operation record DB 130 as J=1. That is, the data analysis engine 330 compares the record R of the operation record DB 130 included in a period between the starting time ST(1)=10:00 and the ending time ET(1)=10:10 with a value at a time 602, and exploits the comparison result.

In Step S13, the data analysis engine 330 sorts the application program names plus the file names with respect to the record of the operation record DB130 of the time span J which is extracted in Step S12. Then, in Step S14, the data analysis engine 330 counts up the number of records in each of the application program names plus the file names with respect to the sorted operation record.

In Step S15, as the result of the count S14, the data analysis engine 330 exploits the top two sets of colors of the application program name plus the file name which are higher in the occurrence frequency. That is, the data analysis engine 330 exploits the application program name plus the file name which are largest in the number of records, and the application program name plus the file name which are second-largest in the number of records. Then, the data analysis engine 330 exploits a first color (color of the first occurrence frequency) corresponding to the application program name plus the file name which are largest in the number of records, and a second color (color of the second occurrence frequency) corresponding to the application program name plus the file name which are second-largest in the number of records from the analysis definition 150 that is read in the Step S2. As a result, in the current time span J, the data analysis engine 330 exploits the top two sets of the application program name plus the file name in the order higher in the occurrence frequency, and exploits two colors corresponding to those application program names and file names.

In Step S16, the data analysis engine 330 determines whether the top two sets of the colors of the application program names plus the file names which are higher in the occurrence frequency with respect to all of time spans J=N, or not. When those two colors have not yet been exploited in all of the time spans J=N, the data analysis engine 330 increments a value of J in Step S17, returns to Step S12, and then executes the above processing in a subsequent time span. When those two colors have been completely exploited in all of the time spans J=N, the data analysis engine 330 terminates the sub-routine and advances to Step S4 in FIG. 7.

In Step S4, the data analysis engine 330 combines the two colors that have been exploited in the processing of FIG. 8 and are top two in the occurrence frequency in each of the time spans J. This processing can be conducted by adding the respective components of RGB of the first color that is highest in the occurrence frequency and the second color that is second-highest in the occurrence frequency in the case where the colors corresponding to the application program names plus the file names are expressed by RGB. For example, in the case where the first color that is highest in the occurrence frequency is green, and the second color that is second-highest in the occurrence frequency is red, the data analysis engine 330 adds the respective components of RGB of those two colors together to provide yellow. Alternatively, in the case where the first color that is highest in the occurrence frequency is green, and the second color that is second-highest in the occurrence frequency is blue, the data analysis engine 330 adds the respective components of RGB of those two colors together to provide a light blue. As described above, the data analysis engine 330 calculates the color obtained by combining the top two colors in each of the time spans J together. The combination of the respective colors of RGB can be appropriately conducted by known manners.

Subsequently, in Step S5, the data analysis engine 330 compares the combined color in each of the time spans J which has been obtained in the Step S4 with the combined color that is stored in the analysis definition 150 to determine the business in each of the time spans J. For example, when the combined color in the time span J is yellow, the data analysis engine 330 determines that the business that has been conducted in the time span J by the operator is the business A, or when the combined color of the time span J is light blue, the data analysis engine 330 determines that the business that has been conducted in the time span J by the operator is the business A.

Figure 12:
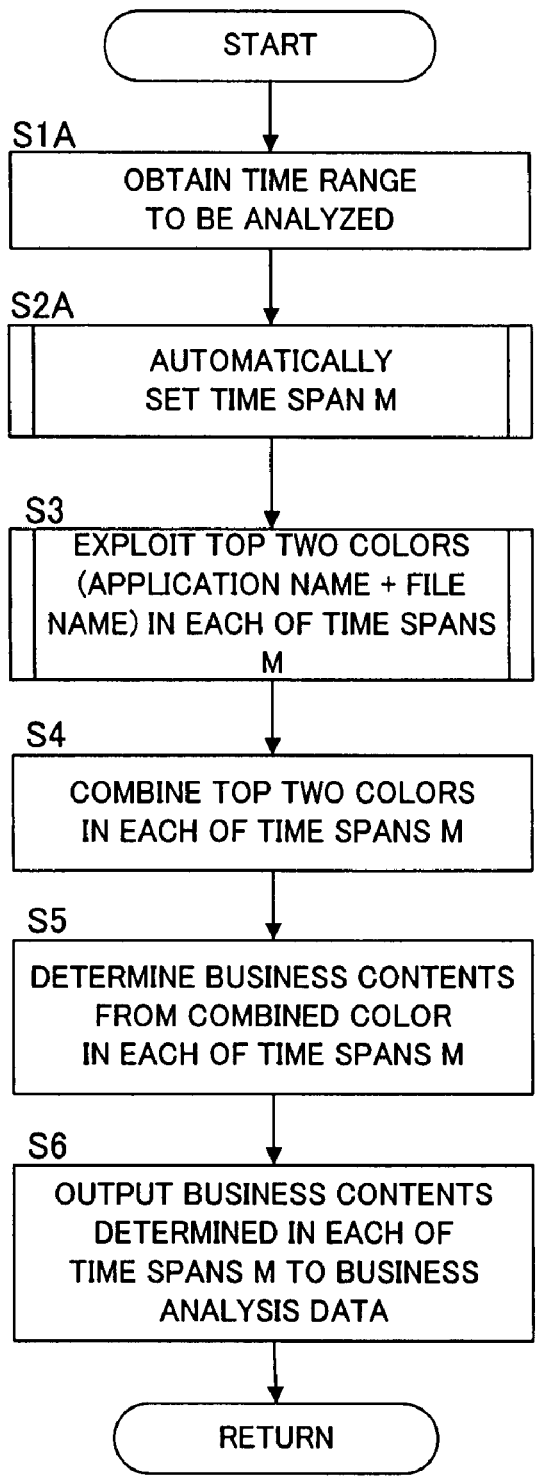
FIG. 12 is a flowchart showing an example of processing executed by a data analysis engine according to a second embodiment of this invention.

In Step S6, the data analysis engine 330 outputs the results obtained in the Steps S4 and S5 to the business analysis data 120 in each of the time spans. As a result, the analysis results in each of the time spans J at a certain terminal PC-n become the business analysis data shown in FIG. 9. FIG. 12 shows an example in which the business analysis data 120 is configured by a time span 121 that stores a value of the time span J, a first color 122 that stores the first color in each of the time spans J, a second color 123 that stores the second color, a combined color 124 that combines the first and second colors together, and the contents of business operations 125 that are determined based on the combined color. The identifier or date can be added to the business analysis data 120 in each of the terminals PC-1 to PC-n or in each of the operators.

Figure 10:
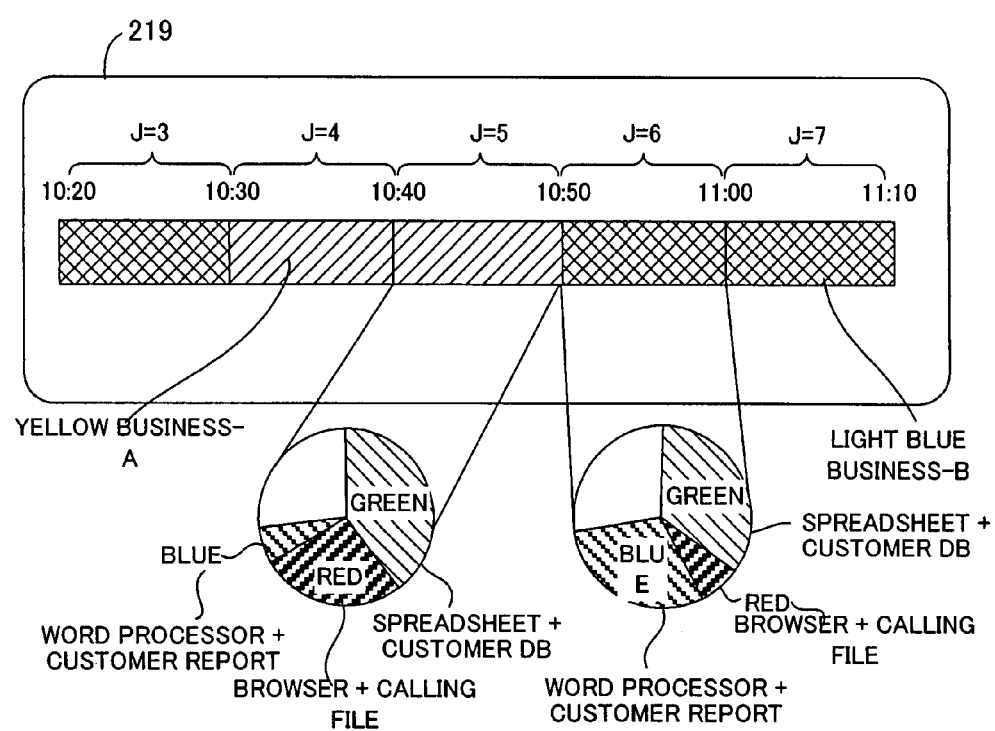
FIG. 10 is an explanatory diagram showing a case in which the business analysis data of one terminal is displayed on a display of a management terminal.

Through the above processing, the contents of business operations that are conducted at the terminals PC-1 to PC-n are estimated in each of the time spans J, and stored in the business analysis data 120. The results of displaying the business analysis data 120 shown in FIG. 9 on the display 219 of the management terminal 200 are shown in FIG. 10. FIG. 10 shows an example in which the results of analyzing the contents of business operations of the certain terminal PC-n at each of the times 10:20 to 11:10 (time span J=3 to 7) are output by the analysis data provider 340, and displayed on the display 219 of the management terminal 200. The analysis data provider 340 outputs the contents of business operations of the respective time spans J to the management terminal 200 as a bar graph in which the contents of business operations of the respective time spans J are indicated by the combined color 124. The axis of abscissa on the bar graph represents a time, and the values of the starting times ST(J) and the ending times ET(J) of the respective time spans J are displayed on the information of the bar graph. Also, the time spans J are output between the starting times ST(J) and the ending times ET(J). The analysis data provider 340 outputs the graph shown in FIG. 10 to the management terminal 200 in a predetermined format such as HTML or XML.

In FIG. 10, shaded areas in the figure indicate yellow areas, which are time spans J where the contents of business operations are determined as the business A, and meshed areas in the figure indicate light blue areas, which are time spans J where the contents of business operations are determined as the business B.

In the paperwork conducted in the office, it is general that a plurality of applications and a plurality of files are employed on the terminals PC-1 to PC-n. For example, at the time span J=5 and J=6, the spreadsheet 51, the browser 52, and the word processor 53 are used, respectively. Because the same application program names and the same file names are used, it is difficult to understand which business is conducted.

Under the circumstances, when the application program names and the file names are compared in the occurrence frequency, at the time span J=5, the occurrence frequency of the spreadsheet 51 and the customer DB 140 is first, and the occurrence frequency of the browser 52 plus the telephony record file 70 is second. Then, when green is set in the spread sheet 51 plus the customer DB 140 as the color of the application program name plus the file name, and red is set in the browser 52 plus the telephony record file 70, the combined color of the time span J=5 is light blue. As a result, it is understood that the business is the business A that mainly conducts calling.

On the other hand, at the time span J=6, the spreadsheet 51, the browser 52, and the word processor 53 are used as in the time span J=5. When the application program names plus the file names are compared in the occurrence frequency, at the time span J=6, the occurrence frequency of the spread sheet 51 plus the customer DB 140 is first, and the occurrence frequency of the word processor 53 plus the customer report 80 is second. Then, the color of the application program name plus the file name is green, and when blue is set in the word processor 53 plus the client report 80, the combined color of the time span J=6 is light blue. As a result, it is understood that the business is the business B that mainly conducts reporting.

As described above, the data analysis engine 330 separates the combinations of the application program names plus the file names which are used in each of the time spans J by color, and exploits a given number (a plurality) of applications names and the file names which are higher in the occurrence frequency within the time span J. Then, the data analysis engine 330 combines the colors corresponding to the exploited application program names plus file names, and outputs the combined colors to the display 219 of the management terminal 200 as the main business contents in each of the time spans J. The combined color is determined by the plurality of combinations of application program names and file names corresponding to the contents of business operations by the manager in advance, and the manager is capable of readily estimating the contents of business operations of the terminal PC-n which have been conducted in the time span J from the color separation in each of the time spans J that are displayed on the display 219. In particular, in the case where the contents of business operations are different when the same application is used but the used file is different, as described above, the color is associated with the application program name plus the file name as one combination, thereby enabling the contents of business operations in a certain time span J to be precisely estimated.

Also, since the operator who uses the terminal PC-1 to PC-n does not need to conduct specific operation in order to understand the contents of business operations as in the conventional example, no load of the business increases.

Figure 11:
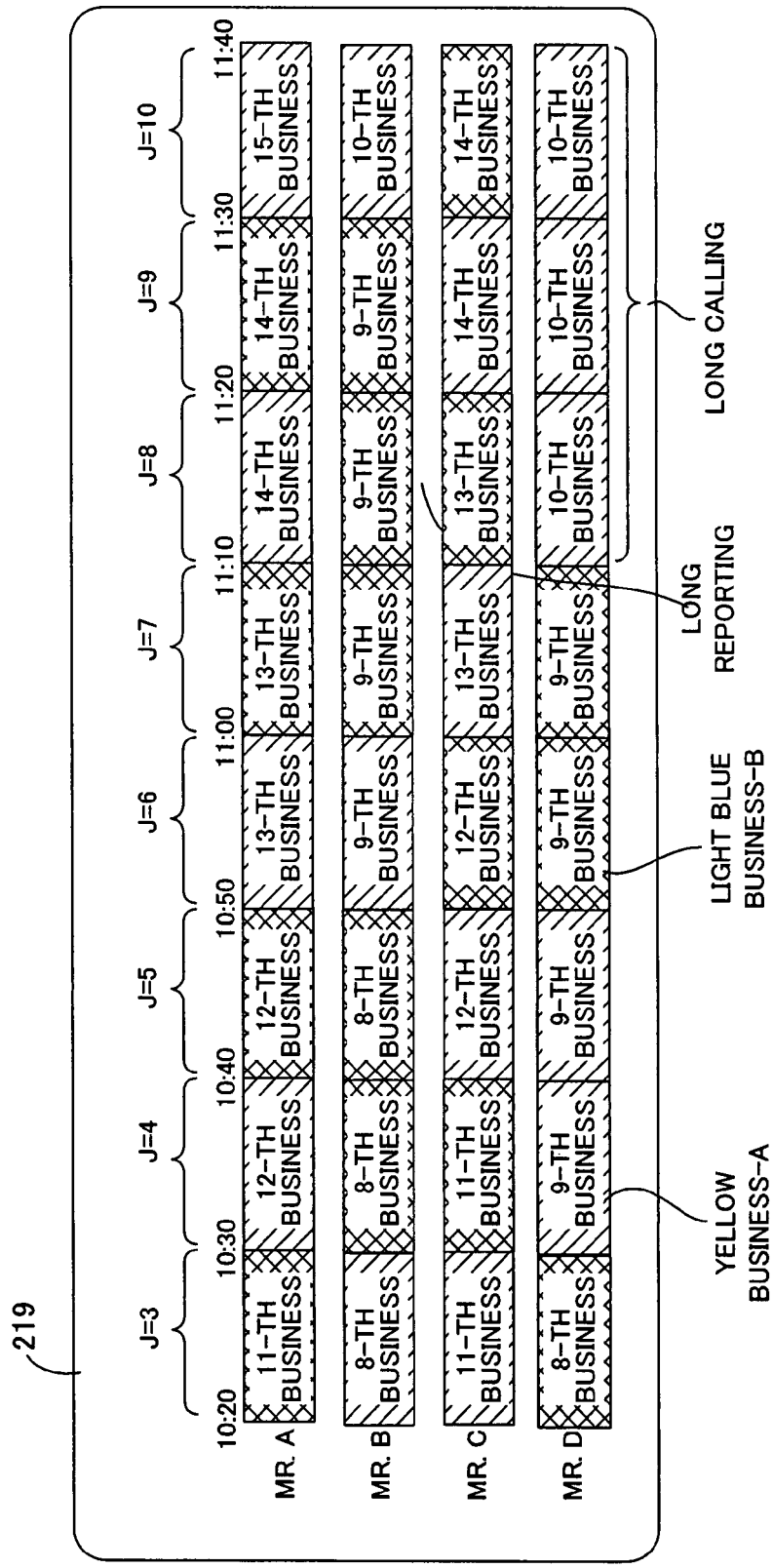
FIG. 11 is an explanatory diagram showing a case in which the business analysis data of a plurality of terminals is displayed on a display of a management terminal.

Then, on the business analysis data 120, the results of analyzing the contents of business operations of the plurality of terminals PC-1 to PC-n in the respective time spans J are displayed on the display 219 of the management terminal 200, for example, as shown in FIG. 11.

FIG. 11 shows the results of displaying the business analysis data 120 of the plurality of terminals PC-1 to PC-n on the display 219 of the management terminal 200. FIG. 11 shows an example in which the analysis data provider 340 outputs the results of analyzing the contents of business operations of the plurality of terminals PC-1 to PC-n in each of the times 10:20 to 11:40 (time span J=3 to 9) according to a request from the management terminal 200, and displays the output analysis results on the display 219 of the management terminal 200.

When the contents of business operations of the plurality of terminals PC-1 to PC-n at the same time are compared with each other by the management terminal 200, it is possible to visually know the progress of the business operations by the operators of the respective terminals PC-1 to PC-n by color separation of the business operations. Like FIG. 10, FIG. 11 shows that the shaded areas in the figure represent yellow areas, which are the time span J where the contents of business operations are determined as the business A, and the meshed areas in the figure represent light blue areas, which are time span J where the contents of business operations are determined as the business B, and the identifiers of the operators are added instead of the identifiers of the terminals PC-1 to Pc-n. In the case where the management terminal 200 obtains the business analysis data 120 of the plurality of terminals PC-1 to PC-n, the management terminal 200 can instruct the plurality of terminal identifiers and the range of the terminal identifiers in addition to the starting time and the ending time to the analysis data provider 340 of the server 100.

It is recognized at a glance that the progresses of the contents of business operations are different from each other depending on the interest of the customers or the individual difference of the operators even if the business operations are the same. For example, in the time span J=9 to 9 of, for example, Mr. B of the operator, a period of time of the business B that conducts reporting is long, and a period of time of calling (business A) immediately before the business B is not long. As a result, it can be estimated that there arises a problem that Mr. B has the weakness in the operation of the application on the business B. Also, in the time span J=8 to 10 of Mr. D, since the calling period of time is long, it can be estimated that the interest of the customer is high.

As described above, the business analysis data 120 of the plurality of terminals PC-1 to PC-n are compared with each other on the same screen, thereby making it possible to visually know the individual difference of the progress of the business, or the portion that can be estimated as a bottleneck. As a result, it is possible that the manager of the business operations rapidly plans the distribution of the business according to the performance of the operator.

In FIG. 11, the turn between the light blue and the yellow is dealt with as calling for a new customer so that the number of callings can be counted up, and in the case of the office such as a call center where the formulaic business is repeated, it is possible to estimate the number of business operations that are processed from the turn of colors.

In the above example, the colors of the application program name plus the file name are represented by RGB, and the first color and the second color are combined together. Alternatively, the first and second colors are represented by CMY (cyan, magenta, yellow), HSV (hue), saturation value, value, HLS (hue), saturation, or lightness, and can be combined together.

Also, in the case where the contents of business operations that are conducted in the office can be identified by only the application program names, it is possible that the application program names are associated with the colors, and the colors corresponding to the application program names that are higher in the occurrence frequency are combined.

Also, in the above example, the analysis engine 330 starts according to the instruction from the management terminal 200. Alternatively, the data analysis engine 330 can be allowed to start at a given time.

(Second Embodiment)

Figure 13:
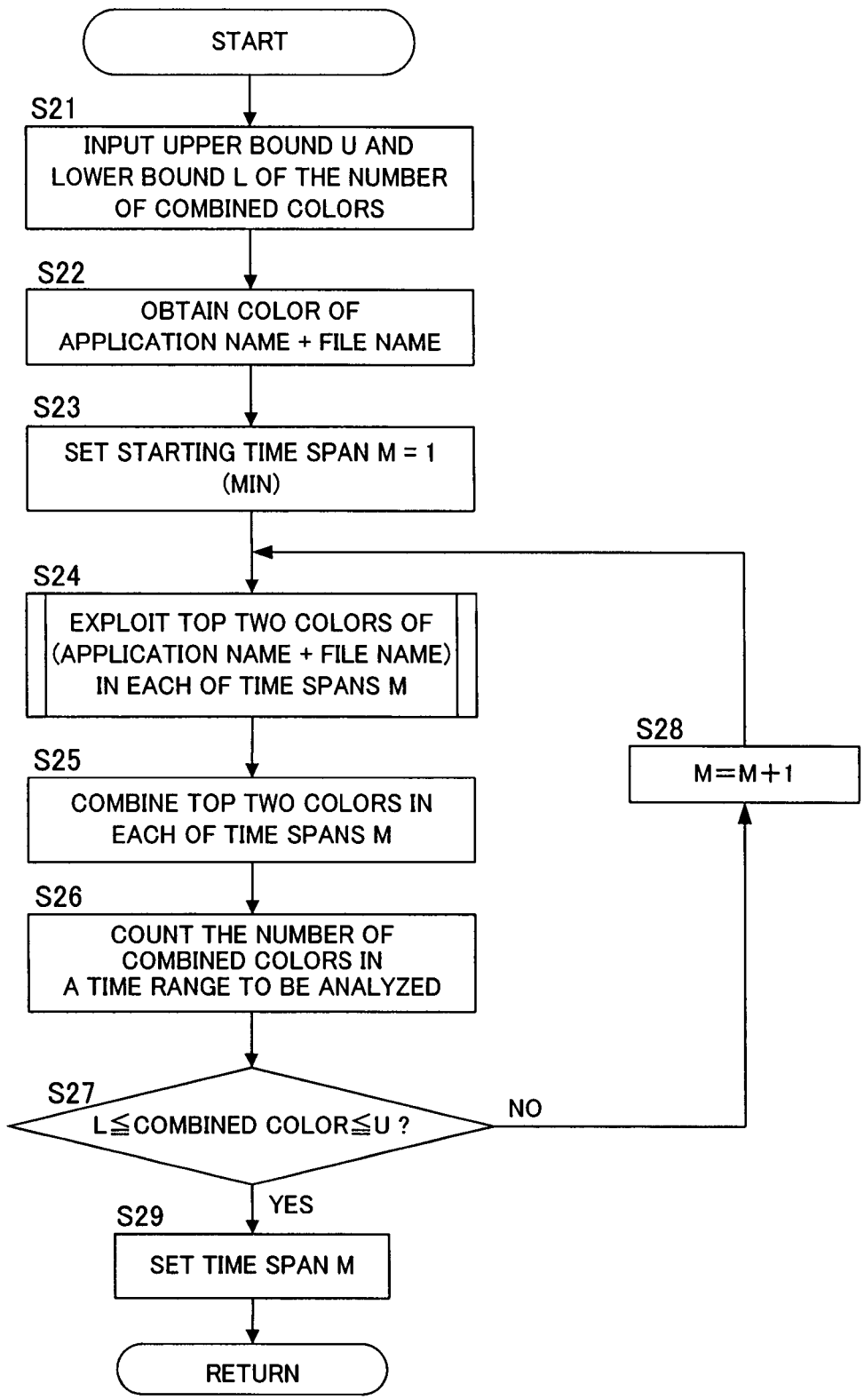
FIG. 13 is a flowchart showing an example of a sub-routine executed in S2A of FIG. 12.

FIGS. 12 and 13 show a second embodiment in which the data analysis engine 330 shown in the above first embodiment automatically sets the time span M to an appropriate value, and other configurations are identical with those in the first embodiment.

In the processing of FIG. 12, Steps S1 and S2 in the flowchart shown in FIG. 7 that illustrates the first embodiment are changed, an upper bound U and a lower bound L of the number of combined colors that are associated with the contents of business operations are set from the management terminal 200, and the time span M is automatically adjusted by the data analysis engine 330 instead of setting the time span M from the management terminal 200. Step S3 and the subsequent steps are identical with those in the first embodiment. A flowchart shown in FIG. 13 is a sub-routine for automatically setting the time span M shown in FIG. 12.

In the first embodiment, the manager sets the time span M from the management terminal 200. However, in the case where a large number of business contents exist in the office to be managed, or in the case where a time interval during which one business is completed or interrupted cannot be understood, there is a fear in that the contents of business operations 125 that has been outputted to the business analysis data 120 does not coincide with the contents of business operations that has been actually conducted when a value of the time span M is improper. For example, in FIG. 11 illustrating the first embodiment, when the time span M is set to a long interval such as 60 minutes, only any one of the business A or the business B is displayed in the respective time spans J, and the actual business contents are not reflected. Conversely, when the time span M is set to a shorter time interval such as 1 minute in the office where a large number of applications or files are employed, there is a case in which the contents of business operations indicated by the combined color in each of the time spans J are frequently changed. In this case, because the number of combined colors is extremely large in the unit of one hour or one day, the manager cannot readily understand what business contents have been conducted by the operators or the employees.

Under the circumstance, in the second embodiment, the manager who operates the management terminal 200 sets the upper bound U and the lower bound L of the types of business contents which are output to the business analysis data 120, that is, the number of combined colors in the time range that conducts the analysis. Then, the data analysis engine 330 determines the time span M within a range between the upper bound U and the lower bound L where the types of the output business contents are set. Then, the data analysis engine 330 reads the operation record from the operation record BD 130 in the time span M that is automatically set, and conducts the same analysis as that in the first embodiment.

Referring to FIG. 12, the data analysis engine 330 obtains the starting time and the ending time of an object to be analyzed which has been input to the analysis condition input module 320 by the management terminal 200 in Step S1A. Then, in Step S2A, the data analysis engine 330 executes the sub-routine of a process of automatically setting the time span M shown in FIG. 13.

In Step S21 of FIG. 13, the data analysis engine 330 receives the upper bound U and the lower bound L of the number of types of business contents (the number of business colors) which have been input by the management terminal 200. In Step S22, colors 153 and 154 of the application program name and the file name are aquisited from the analysis definition 150. In step S23, the data analysis engine 330 sets one minute that is an initial value to the time span M.

In Step S24, the data analysis engine 330 sets the time span J to the time range to be analyzed in the set time span M, and executes the processing shown in FIG. 8 illustrating the first embodiment. That is, the data analysis engine 330 exploits the top two sets of the colors of the application program name plus the file name which are higher in the occurrence frequency in each of the time spans J.

In Step S25, the data analysis engine 330 combines top two colors that are higher in the occurrence frequency in each of the time spans J, exploited from the processing in the step S24, and produces the combined color (business color).

In Step S26, the data analysis engine 330 calculates the number of business colors in the time range to be analyzed. Then, in Step S27, the data analysis engine 330 determines whether the number of combined colors is a value that is equal to or higher than the lower bound L and equal to or lower than the upper bound U, or not. When the number of combined colors is within a range between the upper bound U and the lower bound L, the time span comes to the time span M during which the number of business colors that is desired by the manager is obtained. Therefore, the data analysis engine 330 advances the control to Step S29, sets the present value to the time span M, and executes the processing of Step S4 and the subsequent steps in FIG. 12 to output the combined colors in each of the time spans J to the business analysis data 120.

On the other hand, when the number of combined colors is out of the range between the upper bound U and the lower bound L, the value of the time span M is different from the value desired by the manager. As a result, the data analysis engine 330 advances the control to Step S28, and increments the time span M by a given value. In this example, the given value is set to 1 minute, and the time span M is changed 1 minute by 1 minute.

Since the processing of Step S4 and the subsequent steps in FIG. 12 is identical with that in FIG. 7 illustrating the first embodiment, its description will be omitted.

Through the above processing, the business analysis data 120 within a time during which the contents of business operations are analyzed is within a range between the upper bound U and the lower bound L of the number of business colors that is set from the management terminal 200 by the manager, and is capable of automatically setting the time span M during which the manager readily analyzes the contents of business operations of the respective terminals PC-1 to PC-n.

(First Modified Example)

Figure 14:
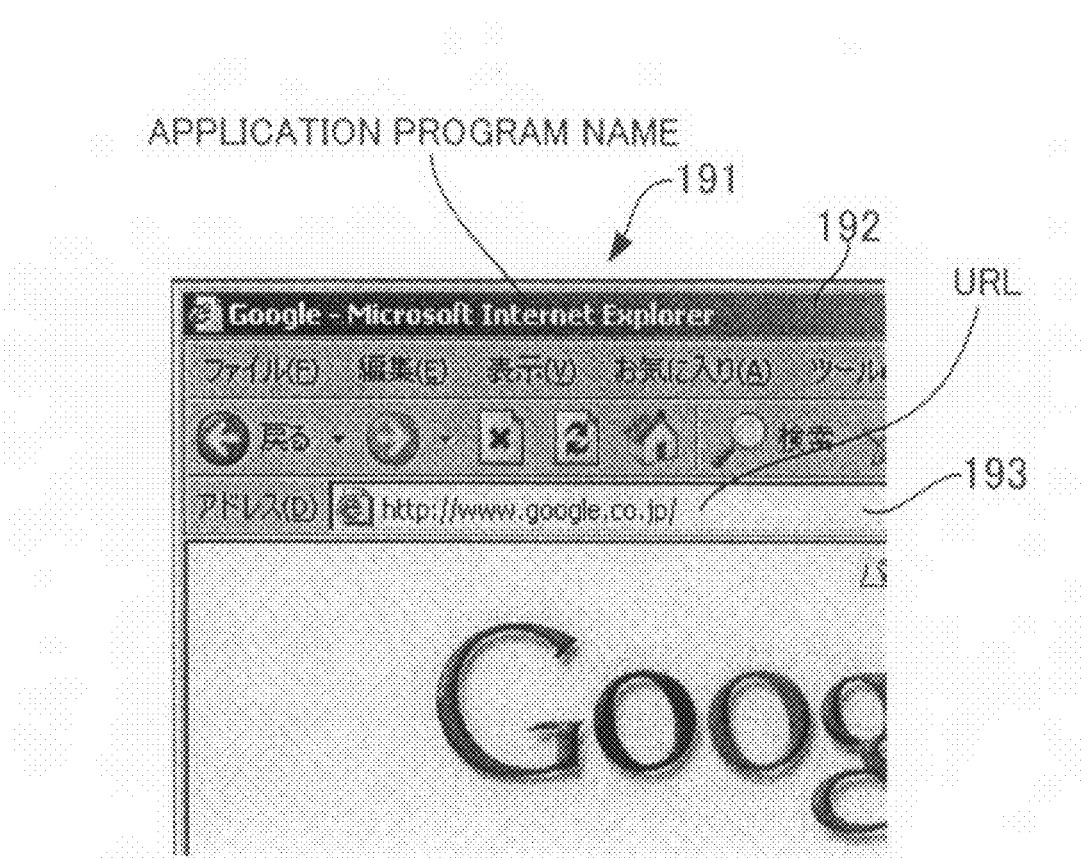
FIG. 14 is an explanatory diagram showing an example of an application program name+URL which are displayed on the display according to a first modified example of this invention.

FIG. 14 shows a first modified example in which an object to be analyzed of the contents of business operations in the terminals PC-1 to PC-n according to the first embodiment or the second embodiment is changed from the application program name plus the file name to the application program name plus uniform resource locator (URL). In this example, the business monitor agent 400 stores the application program name plus URL in the operation record file 60 as the operation record, and other configurations are identical with those in the first or second embodiment.

In the recent office, there is increased an example using a web service that provides the service on the web server, and in this case, the contents of business operations can be specified by the combination of URL indicative of the protocol name that provides the service, the domain name of the server, and the pass name of the document with the application program name instead of the file name of the first or second embodiment.

For example, in the case where OS 30 is Windows, the application program name and the file name are displayed on a title bar 192 and an address bar 193 of the application in a window 191 within the display 190 as shown in FIG. 14. In the example shown in the figure, "Microsoft Internet Explorer" on the title bar 192 indicates the application program name, and http://www.google.co.jp/ within the address bar 193 indicates URL.

Similarly, in this case, the color is set in the application program name plus URL, and a plurality of colors of the application program name plus URL are combined together to set the contents of business operations as in the first or second embodiment.

As described above, in the analysis of the contents of business operations that mainly includes the Web service, the contents of business operations are set by the plurality of combinations of the application program name plus URL, and the results of combining the colors that are set in the respective application program names plus URL are output to the business analysis data 120 and displayed by the management terminal 200 in each of the time spans J, thereby making it possible that the manager readily understands the contents of business operations.

In the above example, in order to identify the Web service, the application program name plus URL are employed. However, as shown in FIG. 15, in the case where a frame obtained by dividing one page into a plurality of windows is employed, the frame names plus tag names are associated with the colors, and the plurality of combinations of frame names plus tag names can be set in one business content.

(Second Modified Example)

Figure 15:
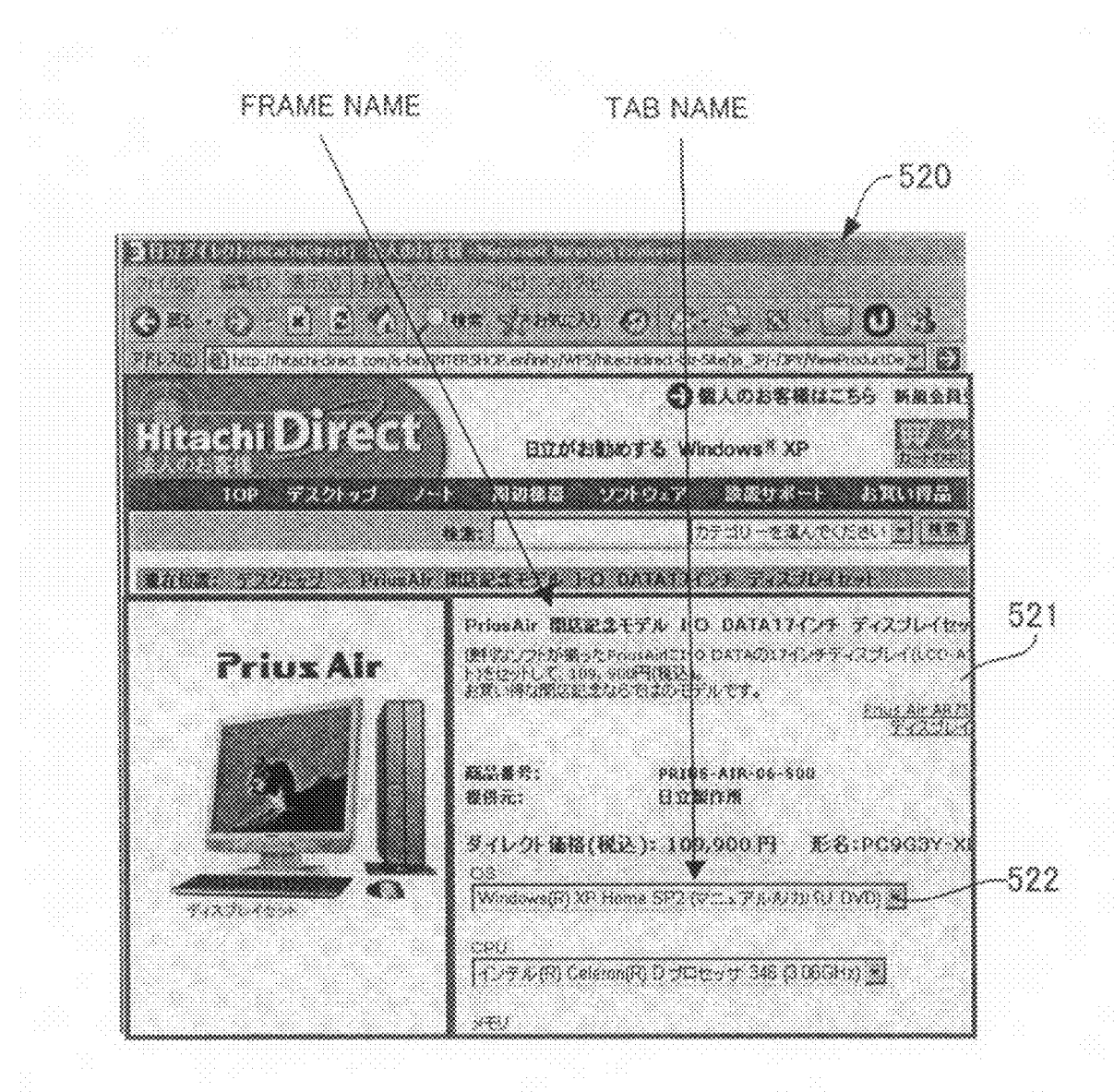
FIG. 15 is an explanatory diagram showing an example of an application program name+tag name which are displayed on the display according to a second modified example of this invention.

In the Web service, there is a case in which a window 520 of the browser is divided into a plurality of frames 521, and services different in each of the frames 521 are provided, as shown in FIG. 15. In this case, as in the first modified example, the frame name and the name of the tag 522 to be operated are paired and associated with the color instead of the application program name plus the file name in the first or second embodiment. Then, one business content can be defined by the plurality of combinations of the frame name plus the tag name. The tag 522 is an identifier that marks the boundary between the elements within the frame 521. The business monitor agent 400 stores the frame name plus the tag name in the operation record file 60 as the operation record.

In the operation records that are stored in the operation record file 60 and the operation record DB 130, the application program name plus the file name according to the first embodiment and the file name plus the tag name can be mixed together. Alternatively, the application program name plus URL according to the first modified example, the frame name plus the tag name, and the application program name plus URL can be mixed in the operation record.

(Third Modified Example)

Figure 16:
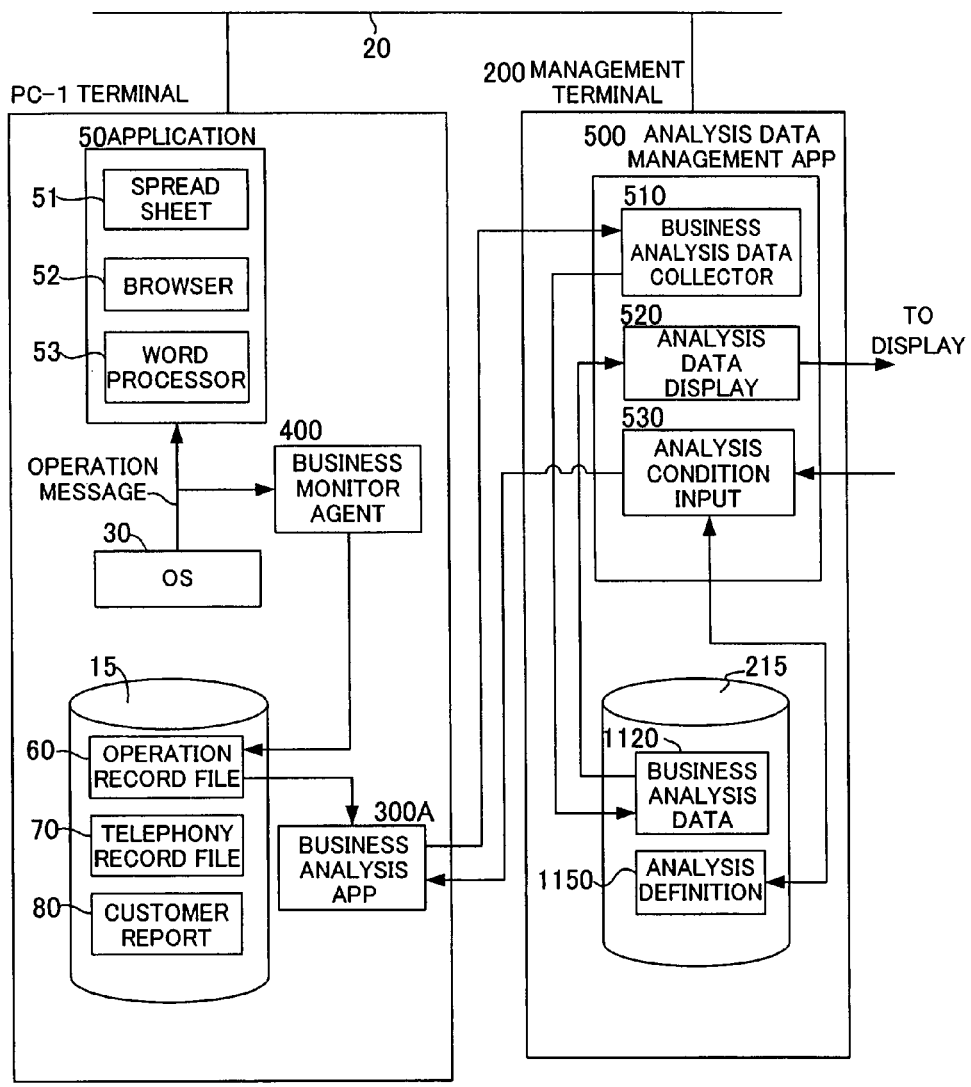
FIG. 16 is a block diagram showing the function of software program executed by a terminal and a management terminal according to a third modified example of this invention.

In the first or second embodiment, the business analysis application 300 is executed by the server 100. Alternatively, as shown in FIG. 16, it is possible that the business analysis application 300A is executed by the respective terminals PC-1 to PC-n, and the management terminal 200 collects the business analysis data from the respective terminals PC-1 to PC-n.

In this case, the management terminal 200 obtains the business analysis data that is obtained by the business analysis application 300A of the respective terminals PC-1 to PC-n, and executes an analysis data management application 500 that is stored in business analysis data 1120 of the storage system 215. The business analysis data 1120 is identical with the business analysis data 120 of the first embodiment.

The analysis data management application 500 includes a business analysis data collector 510, an analysis data display 5201, and an analysis condition input 530. The business analysis data collector 510 collects the business analysis results from the business analysis application 300A of the respective terminals PC-1 to PC-n, and stores the collected analysis results in the business analysis data 1120 of the storage system 215. The analysis data display 5201 outputs the analysis results of the business that has been stored in the business analysis data 1120 to the display 219. The analysis condition input 530 receives the conditions of the business analysis which have been input from the input device 218 by the manager, stores the business analysis condition in the analysis definition 1150 of the storage system 215, and also provides the business analysis application 300A of the respective terminals PC-1 to PC-n with the analysis definition 1150 or the analysis condition. The analysis definition is identical with the analysis definition 150 of the first embodiment.

The business analysis application 300A of the respective terminals PC-1 to PC-n reads the operation record from the operation record file 60 of the respective terminals PC-1 to PC-n based on the analysis condition such as the starting time or the ending time which has been obtained from the analysis condition input 530 of the management terminal 200 and the information on the analysis definition 115, and executes the analysis of the business. Then, the business analysis application 300A transmits the analysis results to the management terminal 200. Other configurations are identical with those in the business analysis application 300 of the first embodiment, and its detailed description will be omitted.

The business analysis data management application 500 reads the business analysis data 1120 of the terminal PC-n that is designated by the manager, and outputs the business analysis data 1120 to the display 219 as a given bar graph as shown in FIGS. 10 and 11.

In this example, as in the first embodiment or the second embodiment, it is possible to analyze the contents of business operations without burdening the operators or the employees who operate the terminals PC-1 to PC-n, and output the analysis results of the contents of business operations with a visually understandable display at the management terminal 200.

(Fourth Modified Example)

In the first or second embodiment, the plurality of combinations of the application program name plus the file name are set in one business content. However, in the case where the contents of business operations that are conducted in the office cannot be understood, the data analysis engine 330 automatically set the color in each of the combinations of the application program name plus the file name which have been stored in the operation record DB 130 (or the application program name plus URL or the frame name plus the tag name), and outputs the combined color in each of the time spans J.

In this case, the data analysis engine 330 can output the application program name plus the file name which configure the combined color by a list in addition to the bar graph shown in FIG. 10. The list is, for example, in the format where the contents of business operations 151 are omitted from the analysis definition 150 shown in FIG. 6, and can be made up of items of the first application program name plus the file name 152 and the first color 153, the second application name plus the file name 154 and the second color 155, and the combined color 156.

As a result, the manager of the business operations in the office is capable of readily knowing what business is conducted by the respective terminals PC-1 to PC-n in each of the terminals PC-1 to PC-n from the lists of the combined color in each of the time spans J, and the list of the application program name plus the file name in each of the terminals PC-1 to PC-n. Also, the manager of the business operations is capable of visually understanding how long which business operation is conducted from a switching timing of the combined colors.

Also, in the first embodiment or the second embodiment, the top two of exploited operation contents (application program name plus the file name) are applied. However, the number of operation contents that are exploited according to the business operations in the office can be appropriately changed.

Also, in the first embodiment or the second embodiment, the business analysis application 300 is executed by the server 100. However, this invention is not limited to this embodiment, but the business analysis application can be executed in each of the terminals PC-1 to PC-n. In this case, the business analysis data that has been analyzed by the respective terminals PC-1 to PC-n can be transmitted to the management terminal 200.

Also, in the first embodiment or the second embodiment, the business analysis application 300 obtains the occurrence frequency of the application program name plus the file name. Alternatively, the business analysis application 300 can obtain the use ratio of the application name plus the file name in the time span J, and exploit the plurality of combinations of the application program name plus the file name from the higher order of the use ratio to a given order.

As described above, the business content analysis method and method according to this invention can be applied to a computer system or program which manages the contents of business operations in the office. Alternatively, the business content analysis method and method according to this invention can be applied to a computer system or program which plans the business distribution to each of the employees.

While the present invention has been described in detail and pictorially in the accompanying drawings, the present invention is not limited to such detail but covers various obvious modifications and equivalent arrangements, which fall within the purview of the appended claims.

What is claimed is:

1. A non-transitory computer-usable storage medium having computer readable instructions stored thereon for execution by a processor to implement a business analysis system that analyzes contents of business operations conducted by a user of a computer based on operation records of the user with respect to a plurality of software programs operated by the computer, the business analysis system comprising:
    a monitor module that obtains information on operations of the user with respect to software programs selected by the user among the plurality of software programs operated by the computer;
    an operation record storage module that stores the information on operations of the user obtained by the monitor module as the operation records in association with times at which the information on operations of the user are obtained and with identification information of the software programs to be operated;
    a time span setting module that obtains a time range during which analysis is conducted, and divides the obtained time range into a plurality of time spans by a predetermined time interval;
    an operation record exploiting module that compares each of the times at which the information on operations of the user included in the operation records are obtained with the corresponding time span within the time range to exploit the respective operation records in the respective time spans;
    a time span-basis occurrence frequency calculation module that obtains occurrence frequencies of the identification information of the respective software programs from the exploited operation records in the respective time spans;
    an identification information exploiting module that exploits the identification information of the plurality of software programs in a higher order of the occurrence frequency to a predetermined ordinal rank in the respective time spans; and
    a business content estimating module that estimates one business content that is executed by the computer in each of the time spans based on a combination of the exploited identification information of the plurality of software programs, and
    wherein the business content estimating module has an analysis definition that sets color information in each of the identification information of the software programs,
    wherein the business content estimating module combines the color information of the exploited identification information of the plurality of software programs together to produce information on a combined color, and
    wherein the business content estimating module outputs the information on the produced combined color as an estimated business content.

2. The computer-usable storage medium according to claim 1, wherein the identification information includes a name of application constituting the software program and a name of a file accessed by the application.

3. A non-transitory computer-usable storage medium having computer readable instructions stored thereon for execution by a processor to implement a business analysis system that analyzes contents of business operations conducted by a user of a computer based on operation records of the user with respect to a plurality of software programs operated by the computer, the business analysis system comprising:
    a monitor module that obtains information on operations of the user with respect to software programs selected by the user among the plurality of software programs operated by the computer;
    an operation record storage module that stores the information on operations of the user obtained by the monitor module as the operation records in association with times at which the information on operations of the user are obtained and with identification information of the software programs to be operated;
    a time span setting module that obtains a time range during which analysis is conducted, and divides the obtained time range into a plurality of time spans by a predetermined time interval;
    an operation record exploiting module that compares each of the times at which the information on operations of the user included in the operation records are obtained with the corresponding time span within the time range to exploit the respective operation records in the respective time spans;

a time span-basis occurrence frequency calculation module that obtains occurrence frequencies of the identification information of the respective software programs from the exploited operation records in the respective time spans;

an identification information exploiting module that exploits the identification information of the plurality of software programs in a higher order of the occurrence frequency to a predetermined ordinal rank in the respective time spans; and a business content estimating module that estimates one business content that is executed by the computer in each of the time spans based on a combination of the exploited identification information of the plurality of software programs, and wherein the business content estimating module has an analysis definition that sets a combination of the identification information of the plurality of software programs associated with the contents of business operations, color information that is preset for each of the identification information of the software, and information of a combined color that combines color information of the plurality of identification information corresponding to the contents of business operations together, and wherein the business content estimating module combines the color information of the exploited identification information of the plurality of software programs together to produce information on a combined color, and outputs the contents of business operations corresponding to the information of the combined color.

4. The computer-usable storage medium according to claim 3, wherein the identification information includes a name of application constituting the software program and a name of a file accessed by the application.

5. A non-transitory computer-usable storage medium having computer readable instructions stored thereon for execution by a processor to implement a business analysis method that analyzes contents of business operations conducted by a user of a computer based on operation records of the user with respect to a plurality of software programs operated by the computer, the business analysis method comprising:

obtaining information on operations of the user with respect to software programs selected by the user among the plurality of software programs operated by the computer;

storing the obtained information on operations of the user as the operation records in association with times at which the information on operations of the user are obtained and with identification information of the software programs to be operated;

obtaining a time range during which analysis is conducted and dividing the obtained time range into a plurality of time spans by a predetermined time interval;

comparing each of the times at which the information on operations of the user included in the operation records are obtained with the corresponding time span within the time range to exploit the respective operation records in the respective time spans;

obtaining occurrence frequencies of the identification information of the respective software programs from the exploited operation records in the respective time spans;

exploiting the identification information of the plurality of software programs in a higher order of the occurrence frequency to a predetermined ordinal rank in the respective time spans; and estimating one business content that is executed by the computer in each of the time spans based on a combination of the exploited identification information of the plurality of software programs, and wherein the estimating one business content comprises:

combining the color information of the exploited identification information of the plurality of software programs together and producing information on a combined color based on an analysis definition that sets color information in each of the identification information of the software programs; and outputting the information on the combined color as an estimated business content.

6. The computer-usable storage medium according to claim 5, wherein the identification information includes a name of application constituting the software program and a name of a file accessed by the application.

7. A non-transitory computer-usable storage medium having computer readable instructions stored thereon for execution by a processor to implement a business analysis method that analyzes contents of business operations conducted by a user of a computer based on operation records of the user with respect to a plurality of software programs operated by the computer, the business analysis method comprising:

obtaining information on operations of the user with respect to software programs selected by the user among the plurality of software programs operated by the computer;

storing the obtained information on operations of the user as the operation records in association with times at which the information on operations of the user are obtained and with identification information of the software programs to be operated;

obtaining a time range during which analysis is conducted and dividing the obtained time range into a plurality of time spans by a predetermined time interval;

comparing each of the times at which the information on operations of the user included in the operation records are obtained with the corresponding time span within the time range to exploit the respective operation records in the respective time spans;

obtaining occurrence frequencies of the identification information of the respective software programs from the exploited operation records in the respective time spans;

exploiting the identification information of the plurality of software programs in a higher order of the occurrence frequency to a predetermined ordinal rank in the respective time spans; and estimating one business content that is executed by the computer in each of the time spans based on a combination of the exploited identification information of the plurality of software programs, and wherein the estimating one business content comprises:

combining the color information of the exploited identification information of the plurality of software programs together and producing information on a combined color based on an analysis definition that sets a combination of the identification information of the plurality of software programs associated with the contents of business operations, color information that is preset for each of the identification information of the software and combines color information of the plurality of identification information corresponding to the contents of business operations together; and
outputting the contents of business operations corresponding to the information of the produced combined color.

8. The computer-usable storage medium according to claim 7, wherein the identification information includes a name of application constituting the software program and a name of a file accessed by the application.

* * * * *